(12) United States Patent
Oberle

(10) Patent No.: US 7,791,483 B2
(45) Date of Patent: Sep. 7, 2010

(54) GAME SYSTEM USING RFID TAGS

(75) Inventor: Robert R. Oberle, Macungie, PA (US)

(73) Assignee: RCD Technology Inc., Quakertown, PA (US)

( * ) Notice: Subject to any disclaimer, the term of this patent is extended or adjusted under 35 U.S.C. 154(b) by 275 days.

(21) Appl. No.: 12/104,625

(22) Filed: Apr. 17, 2008

(65) Prior Publication Data

US 2008/0297317 A1 Dec. 4, 2008

Related U.S. Application Data

(60) Provisional application No. 60/940,477, filed on May 29, 2007.

(51) Int. Cl.
*G08B 13/14* (2006.01)

(52) U.S. Cl. ............. 340/572.1; 340/572.9; 340/323 R; 273/309

(58) Field of Classification Search ... 340/572.1–572.9, 340/323 R; 273/309, 287, 288
See application file for complete search history.

(56) References Cited

U.S. PATENT DOCUMENTS

| | | | | |
|---|---|---|---|---|
| 5,507,491 | A * | 4/1996 | Gatto et al. | 273/139 |
| 5,690,332 | A * | 11/1997 | Rechs | 273/260 |
| 6,606,104 | B1 * | 8/2003 | Kondo et al. | 715/764 |
| 7,205,896 | B2 * | 4/2007 | Wu et al. | 340/572.1 |
| 2007/0046468 | A1 * | 3/2007 | Davis | 340/572.1 |
| 2007/0057469 | A1 * | 3/2007 | Grauzer et al. | 273/309 |
| 2007/0103301 | A1 * | 5/2007 | Bowman et al. | 340/572.1 |

FOREIGN PATENT DOCUMENTS

WO WO0247013 A2 6/2002

OTHER PUBLICATIONS

International Search Report for PCT/US08/63724, Jul. 17, 2008, 7 pages.

* cited by examiner

*Primary Examiner*—Daniel Previl
(74) *Attorney, Agent, or Firm*—Fliesler Meyer LLP

(57) ABSTRACT

A game can comprise a board with multiple RFID antennas and a game piece with a RFID antenna. When one of the multiple RFID antennas is adjacent to the RFID antenna in the game piece, the response characteristics of these RFID antennas can change so that the position of the game piece can be determined.

15 Claims, 2 Drawing Sheets

GAME SYSTEM USING RFID TAGS

CLAIM OF PRIORITY

This application claims priority to U.S. Provisional Application No. 60/940,477 entitled "GAME SYSTEM USING RFID TAGS" filed May 29, 2007, which is incorporated herein by reference.

BACKGROUND

Board games are a popular type of games which typically use game pieces that are positioned or moved on a board. Examples include chess, Go, Sorry and Monopoly.

DETAILED DESCRIPTION

One embodiment of the present invention is a game 100 comprising a board 102 with multiple RFID antennas, and a game piece 104 with a RFID antenna. When the RFID antenna in the game piece 104 is adjacent to one of the multiple RFID antennas of the board, the response characteristics of these RFID antennas can change so that the position of the game piece 104 can be determined.

Figure 1:
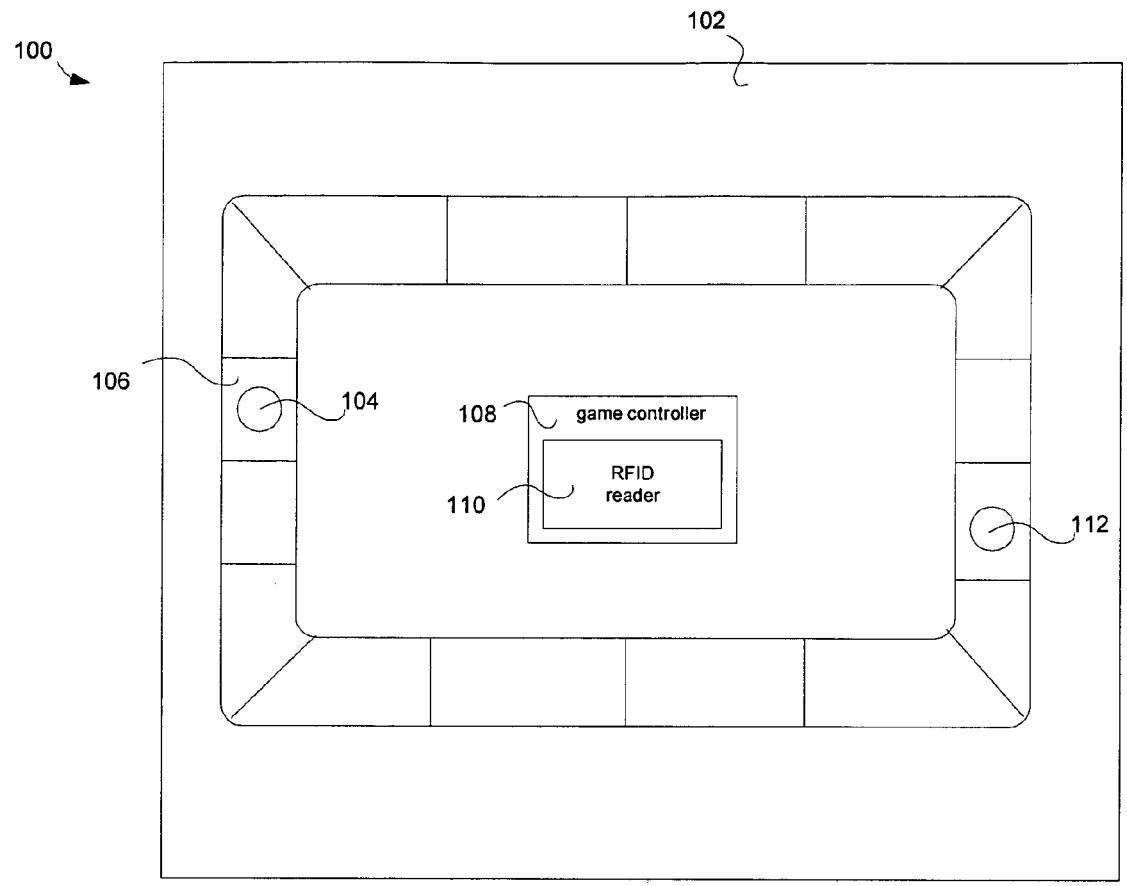
FIG. 1 shows an exemplary game of one embodiment of the present invention.

FIG. 1 shows an example with a board 102 having a number of positions. Board RFID antennas can be placed at these positions. In this example, game piece 104 is over position 106. The boards and game pieces can be of any shape. The positions of the RFID antennas on the board can be in any pattern.

In one embodiment, the frequency response of the RFID antennas will shift when the antennas are adjacent. The RFID reader can be adjusted to detect this shift.

The RFID antennas can be associated with an RFID chip containing identifying data. The RFID antenna of the board can have encoded information to allow detection of position. The RFID antenna of the game piece can have encoded information to allow identification of the game piece. The identifying information can allow the game controller to determine the position of the game piece.

A game controller 110 including a RFID reader 108 can determine that game piece 104 is a position 106 by detecting identifying information of the gamepiece/position pair.

Multiple game pieces with RFID antennas can also be used. For example, a chess game could have RFID tag identifiers in each game piece and on each square. The game controller can use changes in the detected identifying information to determine the gamepiece/position pairs. For example, when a knight moves from position g8 to position f6, the identifying information for the RFID antenna at position g8 is no longer received, while the identifying information for the RFID antenna at position f6 is newly received. This will be enough for the system to determine that the game piece that used to be at position g8 is now at position f6. The game controller can also observe that the knight is no longer detected while the game piece is being moved and use this information in the modeling of the gamepiece/position pairs.

In one example, the game controller can produce a relevant display, indicate an illegal move or do some other actions triggered by detecting the game pieces' position. For example, an electronic monopoly game can offer a property for sale the first time the property is landed on; an electronic chess game can indicate an improper rook move or an electronic trivia game can ask a question that is appropriate for a specific space landed on.

Figure 2:
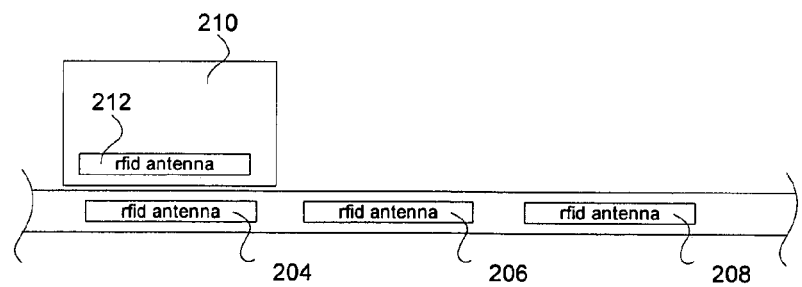
FIG. 2 shows a cross section of a board and game piece with embedded RFID antennas.

FIG. 2 shows a cross-section of the board 202 with multiple embedded RFID antennas 204, 206, and 208. The game piece 210 also encloses an RFID antenna 212. Since RFID antenna 212 is adjacent to RFID antenna 204, these antennas can interact in a manner to indicate the game piece/position pair.

Figure 3:
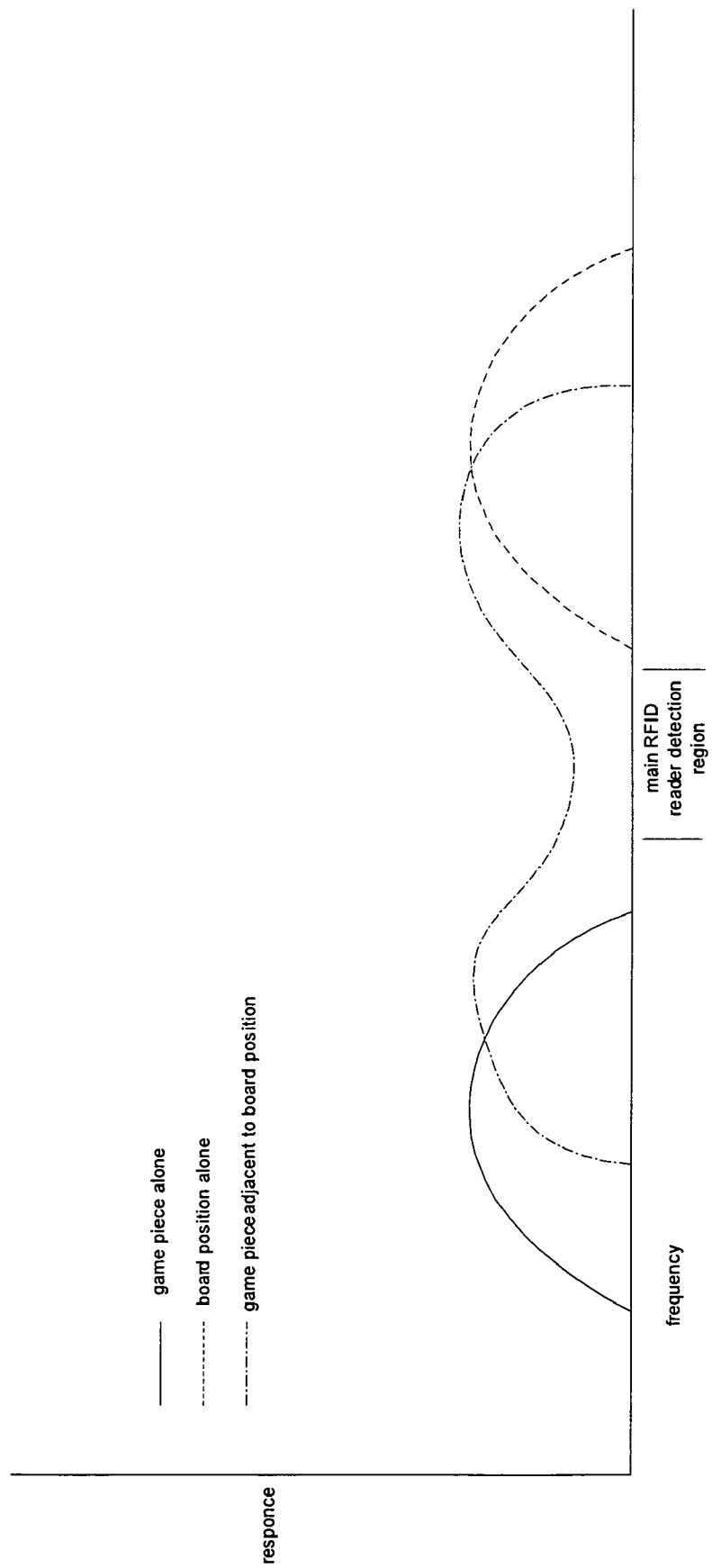
FIG. 3 shows a hypothetical graph that illustrates an exemplary shift in response when a game piece RFID antenna is adjacent to a board position RFID antenna.

In one embodiment, the response characteristics are shifted such that the RFID response within antenna frequency detection range. FIG. 3 shows a hypothetical example where the adjacent posting of the RFID antennas causes a shift in response frequency.

The system of the present invention is not being limited to games. One embodiment is a system comprising a unit with multiple RFID antennas and an element with another RFID antenna. When another RFID antenna is adjacent to one of the multiple RFID antennas, the response characteristics of these RFID antennas is changed so that the position of the element on the unit can be determined. The units and elements can be any type of units or elements.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A game comprising:
   a board with multiple Radio Frequency Identification (RFID) antennas; and
   a game piece with a RFID antenna; wherein when one of the multiple RFID antennas are adjacent to the RFID antenna in the game piece, the response characteristics of these RFID antennas is changed so that the position of the game piece can be determined; and
   wherein when these RFID antennas are not adjacent, these RFID antennas are not detected within a detection frequency range of a separate RFID reader with a reader antenna and when these RFID antennas are adjacent, the response characteristics are shifted such that these antennas are detected within the detection frequency range of the RFID reader.

2. The game of claim 1, wherein the RFID antennas of the board have encoded information to allow detection of position.

3. The game of claim 1, wherein the RFID antenna of the game piece has encoded information to allow identification of the game piece.

4. The game of claim 1, wherein the number of RFID antennas are embedded in the board.

5. The game of claim 1, wherein the RFID antenna is embedded in the game piece.

6. The game of claim 1, further comprising additional game pieces with RFID antennas.

7. A system comprising:

a unit with multiple Radio Frequency Identification (RFID) antennas; and an element with another RFID antenna; wherein when the another RFID antenna is adjacent to one of the multiple RFID antennas, the response characteristics of these RFID antennas is changed so that the position of the element on the unit can be determined; and wherein when these RFID antennas are not adjacent, these RFID antennas are not detected within a detection frequency range of a separate RFID reader with a reader antenna and when these RFID antennas are adjacent, the response characteristics are shifted such that these antennas are detected within the detection frequency range of the RFID reader.

8. The system of claim 7, wherein the RFID tags of the unit have encoded information to allow detection of position.

9. The system of claim 7, wherein another RFID antenna of the element has encoded information to allow identification of the element.

10. The system of claim 7, wherein the number of RFID antennas are embedded in the unit.

11. The system of claim 7, wherein the another RFID antenna is embedded in the element.

12. The system of claim 7, further comprising additional elements with RFID antennas.

13. The system of claim 7, wherein the system is a game.

14. The system of claim 13, wherein the unit is a board.

15. The system of claim 13, wherein the element is a game piece.

* * * * *